United States Patent
Ziv et al.

(10) Patent No.: US 11,885,921 B2
(45) Date of Patent: Jan. 30, 2024

(54) REAL-TIME ARRAY-BASED SEISMIC SOURCE LOCATION

(71) Applicant: RAMOT AT TEL-AVIV UNIVERSITY LTD., Tel Aviv (IL)

(72) Inventors: Alon Ziv, Tel Aviv (IL); Hillel Wust-Bloch, Tel Aviv (IL); Andreas Samuel Eisermann, Hadera (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 317 days.

(21) Appl. No.: 16/957,493

(22) PCT Filed: Dec. 20, 2018

(86) PCT No.: PCT/IB2018/060456
§ 371 (c)(1),
(2) Date: Jun. 24, 2020

(87) PCT Pub. No.: WO2019/130181
PCT Pub. Date: Jul. 4, 2019

(65) Prior Publication Data
US 2021/0072413 A1 Mar. 11, 2021

Related U.S. Application Data

(60) Provisional application No. 62/610,372, filed on Dec. 26, 2017.

(51) Int. Cl.
*G01V 1/00* (2006.01)
(52) U.S. Cl.
CPC ...... *G01V 1/008* (2013.01); *G01V 2210/1232* (2013.01); *G01V 2210/41* (2013.01); *G01V 2210/72* (2013.01)

(58) Field of Classification Search
CPC .......... G01V 1/008; G01V 2210/1232; G01V 2210/41; G01V 2210/72
(Continued)

(56) References Cited

U.S. PATENT DOCUMENTS 7,872,944 B2   1/2011  Eisner et al.
8,867,307 B2 * 10/2014  Guigne ............... G01V 1/20
                                                    181/112

(Continued)

FOREIGN PATENT DOCUMENTS

WO    2007056278 A2    5/2007
WO    2009108394 A2    9/2009
WO    WO-2016091972 A1 *  6/2016

OTHER PUBLICATIONS

International Search Report and Written Opinion from International Application No. PCT/IB2018/060456 dated Jun. 4, 2019.
(Continued)

*Primary Examiner* — Michael P Nghiem
(74) *Attorney, Agent, or Firm* — Dorsey & Whitney LLP

(57) ABSTRACT

Apparatus and methods are described, including identifying an arrival of a first arriving S-wave emitted from a seismic source at an array (120) of sensors (129, 140) in real-time, by continuously analyzing waveforms received by the sensors (120, 140), and continuously monitoring back-azimuth and slowness data within the detected waveforms. Arrival of a first arriving P-wave emitted from the seismic source at the array (120) of sensors (129, 140) is identified, based upon the back-azimuth and slowness data. Slowness and back azimuth of the first arriving P-wave are determined, by analyzing a waveform of the P-wave, and based upon the determined slowness of the first arriving P-wave, the arrival of the first arriving S-wave at the array (120) of sensors (129, 140) is identified. Other applications are also described.

12 Claims, 9 Drawing Sheets

(58) Field of Classification Search
USPC .......................................................... 702/15
See application file for complete search history.

(56) References Cited

U.S. PATENT DOCUMENTS

| | | | |
|---|---|---|---|
| 9,372,272 B2 | 6/2016 | Price et al. | |
| 2008/0151691 A1* | 6/2008 | Eisner | G01V 1/30 367/38 |
| 2008/0285385 A1 | 11/2008 | Cherry | |
| 2009/0299637 A1* | 12/2009 | Dasgupta | G01V 1/288 702/12 |
| 2012/0014216 A1* | 1/2012 | Saenger | G01V 1/28 367/38 |
| 2013/0282291 A1* | 10/2013 | Dasgupta | G01V 1/30 702/13 |
| 2013/0328688 A1* | 12/2013 | Price | G08B 21/10 367/129 |
| 2018/0306751 A1* | 10/2018 | Zeroug | G01N 29/041 |
| 2019/0100407 A1* | 4/2019 | Miyajima | B66B 1/3453 |
| 2021/0199832 A1* | 7/2021 | Wu | G01V 1/48 |

OTHER PUBLICATIONS

Eisermann, et al., "Array-Based Earthquake Location for Regional Earthquake Early Warning: Case Studies from the Dead Sea Transform", Bulletin of the Seismological Society of American, Vo. XX, No. XX, 2018, pp. 1-8.

Eisermann, et al., "Real-Time Back Azimuth for Earthquake Early Warning", Bulletin of the Seismological Society of America, vol. 105, No. 4, Aug. 1, 2015, pp. 1-12.

Joswig, "Nanoseismic Monitoring: Method and First Applications", Nanoseismic Monitoring I: theory, http://citeseerx.ist.psu.edu/viewdoc/download?doi=10.1.1.95.158&rep=rep1&type=pdf last accessed Jun. 24, 2020, Jan. 1, 2006, 24 pages.

Meng, et al., "Application of Seismic Array Processing to Earthquake Early Warning", Bulletin of the Seismological Society of America, vol. 104, No. 5, Oct. 2014, pp. 2553-2561.

Nof, et al., "Integrating Low-Cost MEMS Accelerometer Mini-Arrays (MAMA) in Earthquake Early Warning Systems", Berkeley University of California, Dec. 2016, 2 pages.

Cansi, et al., "Earthquake Location Applied to a Mini-Array: K-Spectrum Versus Correclation Method", Geophysical Research Letters, vol. 20, No. 17, Sep. 3, 1993, pp. 1819-1822.

\* cited by examiner

REAL-TIME ARRAY-BASED SEISMIC SOURCE LOCATION

CROSS-REFERENCE TO RELATED APPLICATIONS

The present application is the U.S. national phase of International application PCT/IB2018/060456 to Ziv (published as WO 19/130181), filed Dec. 20, 2018, which claims priority from U.S. Provisional Patent Application No. 62/610,372 to Ziv et al., filed Dec. 26, 2017, entitled "Real-time array-based seismic source location," which is incorporated herein by reference.

FIELD OF EMBODIMENTS OF THE INVENTION

Some applications of the presently disclosed subject matter relate generally to the field of detecting and locating seismic sources, and in particular, to real-time array-based seismic source location.

BACKGROUND

Constraining seismic source locations in real-time is crucial for many applications, including earthquake early warning, hydraulic fracturing, and tunnel digging detection. Earthquake early warning systems (EEWS) are real-time procedures that assess the potential intensity of ground shaking and disseminate alerts. Two main types of EEWS are available: regional and onsite. Typically, the former approach is based on P-wave attributes at four or more network stations, whereas the latter uses a smaller number of stations deployed at the target site. Unlike onsite systems, the ground-motion assessment by regional systems requires hypocenter location, and severe hypocenter mis-location would result in erroneous ground-motion prediction. Thus, a keystone of an effective regional EEWS is a fast and robust hypocenter location. When the network is sparse or, as is often the case, off the source region, hypocenter location may be slow, inaccurate, and ambiguous. Thus, seeking ways to locate off-network earthquakes, resolve ambiguities, and more accurately constrain earthquake locations with less than four network stations is of great interest.

SUMMARY OF EMBODIMENTS

In accordance with some applications of the present invention, one or more arrays of sensors detect the location of a seismic source event (such as, an earthquake, a quarry blast, an underground explosion, underground digging, etc.), in real time with respect to the event.

For some applications, an array of sensors is used to detect waveform data. An epicenter of the seismic source is typically located using data from the array of sensors. For some applications, arrival of a first arriving P-wave emitted from the seismic source at the array of sensors is identified, and the back azimuth of the first arriving P-wave is calculated. Arrival of a first arriving S-wave emitted from the seismic source at the array of sensors is also detected. For some applications, arrival of the first arriving S-wave at the array of sensors is identified, based upon the slowness of the first arriving P-wave. For example, a waveform having a slowness that is a given multiple of the determined slowness of the first arriving P-wave may be detected. Typically, the epicentral distance of the seismic source with respect to the array of sensors is calculated, based upon a time difference between the arrival of the first arriving S-wave at the array of sensors and the arrival of the first arriving P-wave at the array of sensors. Further typically, the epicenter of the seismic source is located based on the epicentral distance and the back-azimuth of the first arriving P-wave.

Typically, the apparatus and methods described herein avoid false alarms by discriminating between seismic events (such as earthquakes) and non-seismic anthropogenic sources, as described in further detail hereinbelow.

There is therefore provided, in accordance with some applications of the present invention, a method including:
identifying an arrival of a first arriving S-wave emitted from a seismic source at an array of sensors in real-time, by:
continuously analyzing waveforms received by the sensors;
continuously monitoring back-azimuth and slowness data within the detected waveforms;
identifying an arrival of a first arriving P-wave emitted from the seismic source at the array of sensors, based upon the back-azimuth and slowness data;
determining slowness and back azimuth of the first arriving P-wave, by analyzing a waveform of the P-wave; and
based upon the determined slowness of the first arriving P-wave, identifying the arrival of the first arriving S-wave at the array of sensors.

In some applications the seismic source includes an earthquake, and identifying the arrival of the first arriving S-wave emitted from the seismic source at the array of sensors in real-time includes identifying an arrival of a first arriving S-wave emitted from the earthquake at the array of sensors in real-time.

In some applications, identifying the arrival of the first arriving S-wave emitted from the seismic source at the array of sensors includes identifying the arrival of the first arriving S-wave emitted from the seismic source at an array of sensors having intra-array sensor apertures of less than 350 meters.

In some applications, identifying the arrival of the first arriving P-wave emitted from the seismic source at the array of sensors includes discriminating between seismic events and non-seismic sources of waveforms.

In some applications, the method further includes calculating an epicentral distance of the seismic source with respect to the array of sensors, based upon a time difference between the arrival of the first arriving S-wave and the arrival of the first arriving P-wave.

In some applications, calculating the epicentral distance of the seismic source with respect to the array of sensors includes using a relationship between (a) the time difference between the arrival of the first arriving S-wave and the arrival of the first arriving P-wave and (b) the epicentral distance that is empirically determined with respect to the array of sensors.

In some applications, the method further includes locating an epicenter of the seismic source based on the epicentral distance and the back azimuth of the first arriving P-wave.

In some applications, identifying the arrival of the first arriving S-wave at the array of sensors based upon the determined slowness of the first arriving P-wave includes identifying a waveform having a slowness that is a given multiple of the determined slowness of the first arriving P-wave.

In some applications, identifying the arrival of the first arriving S-wave at the array of sensors further includes identifying that the waveform having the slowness that is the multiple of the determined slowness of the first arriving P-wave has a back azimuth that is within a given range of the back azimuth of the first arriving P-wave.

There is further provided, in accordance with some applications of the present invention, apparatus including:

an array of sensors configured to detect waveform data; and at least one computer processor configured to identify an arrival of a first arriving S-wave emitted from a seismic source at the array of sensors in real-time, by:

continuously analyzing waveforms received by the sensors, continuously monitoring back-azimuth and slowness data within the detected waveforms, identifying an arrival of a first arriving P-wave emitted from the seismic source at the array of sensors, based upon the back-azimuth and slowness data, determining slowness and back azimuth of the first arriving P-wave, by analyzing a waveform of the P-wave, and based upon the determined slowness of the first arriving P-wave, identifying the arrival of the first arriving S-wave at the array of sensors.

There is further provided, in accordance with some applications of the present invention, a method including:

detecting waveform data using an array of sensors;

identifying arrival of a first arriving P-wave emitted from a seismic source at the array of sensors;

calculating a back azimuth of the first arriving P-wave;

identifying arrival of a first arriving S-wave emitted from the seismic source at the array of sensors;

calculating an epicentral distance of the seismic source with respect to the array of sensors, based upon a time difference between the arrival of the first arriving S-wave at the array of sensors and the arrival of the first arriving P-wave at the array of sensors; and in real-time with respect to the arrival of the first arriving S-wave at the array of sensors, locating an epicenter of the seismic source based on the epicentral distance and the back-azimuth of the first arriving P-wave.

In some applications, the seismic source includes an earthquake, and identifying the arrival of the first arriving S-wave emitted from the seismic source at the array of sensors in real-time includes identifying an arrival of a first arriving S-wave emitted from the earthquake at the array of sensors in real-time.

In some applications, the array of sensors has intra-array sensor apertures of less than 350 meters.

In some applications, identifying the arrival of the first arriving P-wave emitted from the seismic source at the array of sensors includes discriminating between seismic events and non-seismic sources of waveforms.

In some applications, calculating the epicentral distance of the seismic source with respect to the array of sensors includes using a relationship between (a) the time difference between the arrival of the first arriving S-wave and the arrival of the first arriving P-wave and (b) the epicentral distance that is empirically determined with respect to the array of sensors.

In some applications, the method further includes determining slowness of the first arriving P-wave, and identifying arrival of the first arriving S-wave at the array of sensors includes identifying arrival of the first arriving S-wave at the array of sensors, based upon the determined slowness of the first arriving P-wave.

In some applications, identifying the arrival of the first arriving S-wave at the array of sensors based upon the determined slowness of the first arriving P-wave includes identifying a waveform having a slowness that is a given multiple of the determined slowness of the first arriving P-wave.

In some applications, identifying the arrival of the first arriving S-wave at the array of sensors further includes identifying that the waveform having the slowness that is the multiple of the determined slowness of the first arriving P-wave has a back azimuth that is within a given range of the back azimuth of the first arriving P-wave.

There is further provided, in accordance with some applications of the present invention, apparatus including:

an array of sensors configured to detect waveform data; and at least one computer processor configured to locate an epicenter of a seismic source, by:

identifying arrival of a first arriving P-wave emitted from the seismic source at the array of sensors, calculating a back azimuth of the first arriving P-wave, identifying arrival of a first arriving S-wave emitted from the seismic source at the array of sensors, calculating an epicentral distance of the seismic source with respect to the array of sensors, based upon a time difference between the arrival of the first arriving S-wave at the array of sensors and the arrival of the first arriving P-wave at the array of sensors, and in real-time with respect to the arrival of the first arriving S-wave at the array of sensors, locating an epicenter of the seismic source based on the epicentral distance and the back-azimuth of the first arriving P-wave.

The present invention will be more fully understood from the following detailed description of embodiments thereof, taken together with the drawings, in which:

DETAILED DESCRIPTION

A system and a method are disclosed herein for real-time array-based seismic source location. The present system and method may be used for real-time monitoring and detection of earthquakes; in connection with drilling and hydraulic fracturing operations; and in security-related implementations (e.g., detection of tunneling activities).

Seismic source events (such as, earthquakes, quarry blasts, underground explosions, underground digging, etc.) create seismic wave fields which propagate through the earth, e.g. through isotropic formations, and have wave components, including a P-wave (primary or pressure wave) and a S-wave (secondary or shear wave). Each seismic wave has a phase velocity, which is dependent on the layer structure, as well as the density and elastic coefficient of the individual layers (e.g., sediment, rock, etc.), in the area through which the wave propagates. The reciprocal of the phase velocity is slowness, which is a vector quantity. By detecting the arrival times of seismic waves, assuming a basic velocity model for the area, there can be determined a distance to the epicenter of the event. In addition, it was recently shown that robust back azimuth estimations can be determined by advanced particle motion analysis on the first 0.2 seconds of data recorded by three-dimensional (3D) sensors (see Eisermann, A. S., A. Ziv, and G. H. Wust-Bloch (2015), *Real-time back azimuth earthquake early warning*, Bull. Seismol. Soc. Am., 105 (4), doi:10.1785/0120140298, which is incorporated herein by reference).

In some applications of the present invention, a location system uses the arrival times of the P-wave and/or the S-wave components, as detected by one or more sensor arrays, to calculate the epicentral distance and back azimuth of an event source. In some embodiments, the location system of the present disclosure may issue an initial seismic source location in real time, based on (i) receiving data from a single sensor array comprising both P-wave and S-wave arrivals of the seismic waveform; and/or (ii) receiving data from at least two sensor arrays comprising respective P-wave arrivals of the seismic waveform to the at least two sensor arrays. For some applications, the initial seismic source location is determined using the earlier of the two options described in the previous sentence.

Figure 1A:
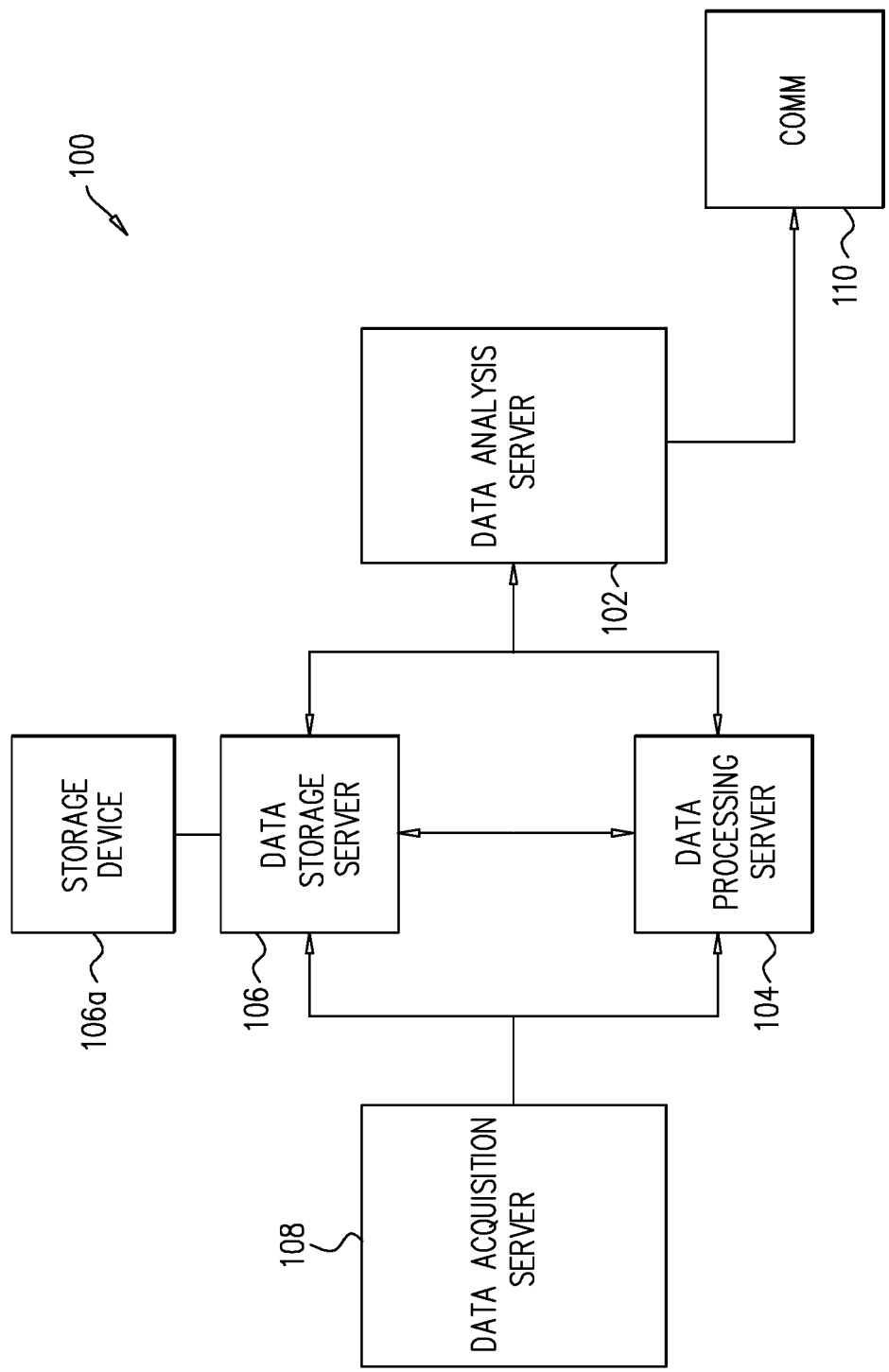
FIG. 1A is a block diagram of a central computing unit, in accordance with some applications of the present invention.

Reference is now made to FIG. 1A, which is a block diagram of a central computing unit 100, in accordance with some applications of the present invention. According to some applications, central computing unit 100 is communicatively connected to one or more geographically-dispersed detection stations, each comprising a sensor array. It will be appreciated that central computing unit 100 is only one possible embodiment of a central computing unit of the present system, and that other configurations may be used, e.g., with different configurations, arrangements, and number of components. The various components of central computing unit 100 may be implemented in hardware, software or a combination of both hardware and software, including one or more signal processing and/or application-specific integrated circuits. In various embodiments, central computing unit 100 may comprise a dedicated hardware device, or may be implemented by computer program instructions executed on a general-purpose computer, a special-purpose computer, or other programmable data processing apparatus.

Central computing unit 100 as shown in FIG. 1A may comprise, for example, one or more servers, such as data analysis server 102, data processing server 104 (which may handle all data traffic between other servers), data storage server 106 (which is typically connected to non-transient computer-readable storage device 106a), and/or data acquisition server 108 (which typically acts as the front-end server that manages communication and data acquisition from the sensor arrays). For some applications, central computing unit 100 includes a communications module 110, which may connect central computing unit 100 to a network, such as the Internet, a local area network, a wide area network and/or a wireless network. Storage device 106a typically stores computer program instructions for execution on the various servers of the central computing unit 100. For some applications, such computer program instructions include an operating system, various software components and/or drivers for controlling and managing general system tasks (e.g., memory management, storage device control, power management, etc.), and facilitating communication between various hardware and software components.

Figure 1B:
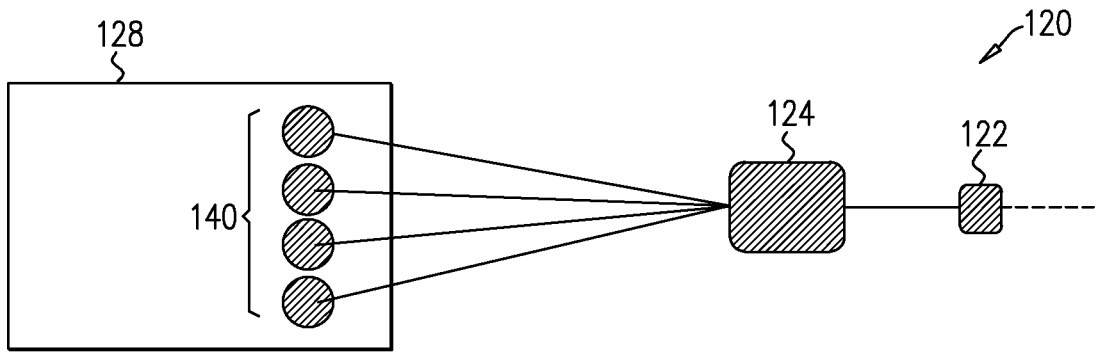
FIGS. 1B and 1C are schematic illustrations of sensor array configurations, in accordance with some applications of the present invention.
Figure 1C:
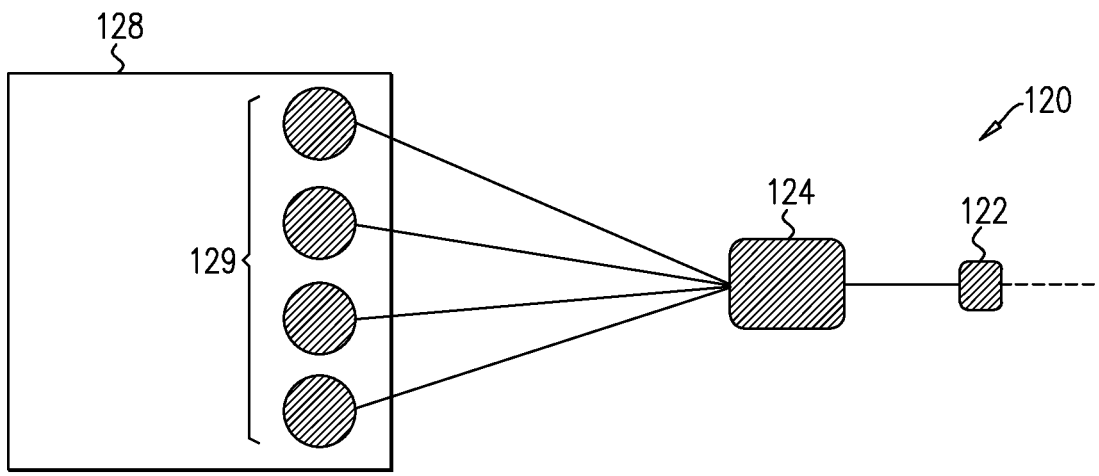

Reference is now made to FIGS. 1B and 1C, which are schematic illustrations of sensor array layouts 120, in accordance with some applications of the present invention. It will be appreciated that various other sensors array layouts may be used with the present apparatus and method, which may have more or fewer sensors and may have different arrangements of sensors with respect to each other, as compared with those shown in FIGS. 1B and 1C. Typically, each of sensor array layouts 120 comprises a remote computing module 122, a data acquisition server or module 124, and an array 128 of sensors. For some applications, the sensors within arrays 128 include 3D Broadband (0.008-100 Hz) velocity-meters 140 (e.g., Trillium compact and Guralp T-40); 3D short-period (1-80 Hz) velocity-meters 129 (e.g., Lennartz LE-3D); 3D 24-bit (0.1-40 Hz) high performance accelerometers (e.g., EQMet TSA-SMA); and/or 3D 14-bit micro-electro-mechanical systems (MEMS, 0.1-11 Hz) (e.g., JoyWarrior JWF-14). Typically, there are four or more such sensors in each array.

Within each layout of sensors, such as those shown in FIGS. 1B and 1C, the intra-array apertures are selected such as to best detect a given type of seismic event, and may vary between several meters and several kilometers. For some applications, an array that is configured to detect earthquakes has intra-array apertures that are greater than 45 meters and/or less than 350 meters. For example, the intra-array apertures may be between 45 and 350 meters. For some applications, an array that is configured to detect earthquakes has a total array aperture of more than 300 meters and less than 1000 meters (e.g., 300-1000 meters). For some applications, an array that is configured to detect underground tunneling has a total array aperture of less than 100 meters. In a plurality of networked sensor arrays 128, inter-array apertures may range, for example, between 1,700-13,500 meters. Each sensor array may be connected to a communication line (e.g., ADSL lines), and may be powered through a local electric outlet or by, e.g., solar panels.

The intra-array layout geometries may be randomized, so as maximize sensor spacing while accounting for technical and logistical constraints (for example, maximum cable lengths), as well as avoiding anthropogenic sources of noise and interference. For some applications, individual sensors are installed at a minimal depth of 200 cm on a concrete base, for example, in a cased shallow borehole, or in a vault. Such a housing arrangement is configured to improve signal-to-noise (SNR) ratios, and limit the effects on the sensors of thermal spikes, humidity, corrosive agents in the ambient environment, as well as potential vandalism.

With continued reference to FIGS. 1B and 1C, the data from individual sensors in a sensor array 128 may be collected by data acquisition module 124 (which may be a data logger, such as a DMT Summit M Hydra), which is communicatively connected to remote computing module 122. In some applications, individual sensors 129 or 140, are connected directly to remote computing module 122. Remote computing module 122 typically enables remote access and full system operation, including monitoring of state of health (SOH) functions, supervising data transfer, and supporting and controlling communication. A plurality of remote commuting modules 122 may be communicatively connected to central computing unit 100 in FIG. 1A, e.g., through secure communication lines such as OpenVPN tunnels. Data transfer between sensor arrays and the central computing unit 100 may comprise real time raw data transfer, as well as follow up safe mode data transfer. For example, raw data may be transferred instantaneously from a ring buffer of the data acquisition module 124 and forwarded to the central computing unit 100, such that the total latency of data transfer to the central computing unit 100 ranges between 0.02-0.1 seconds. Central computing unit 100 typically run checks for data quality and completeness, and when flagged, sends requests to the remote computing modules 122 for missing or incomplete data strings. A follow up safe mode data transfer may then take place in near real-time, to guarantee data completeness.

Figure 2A:
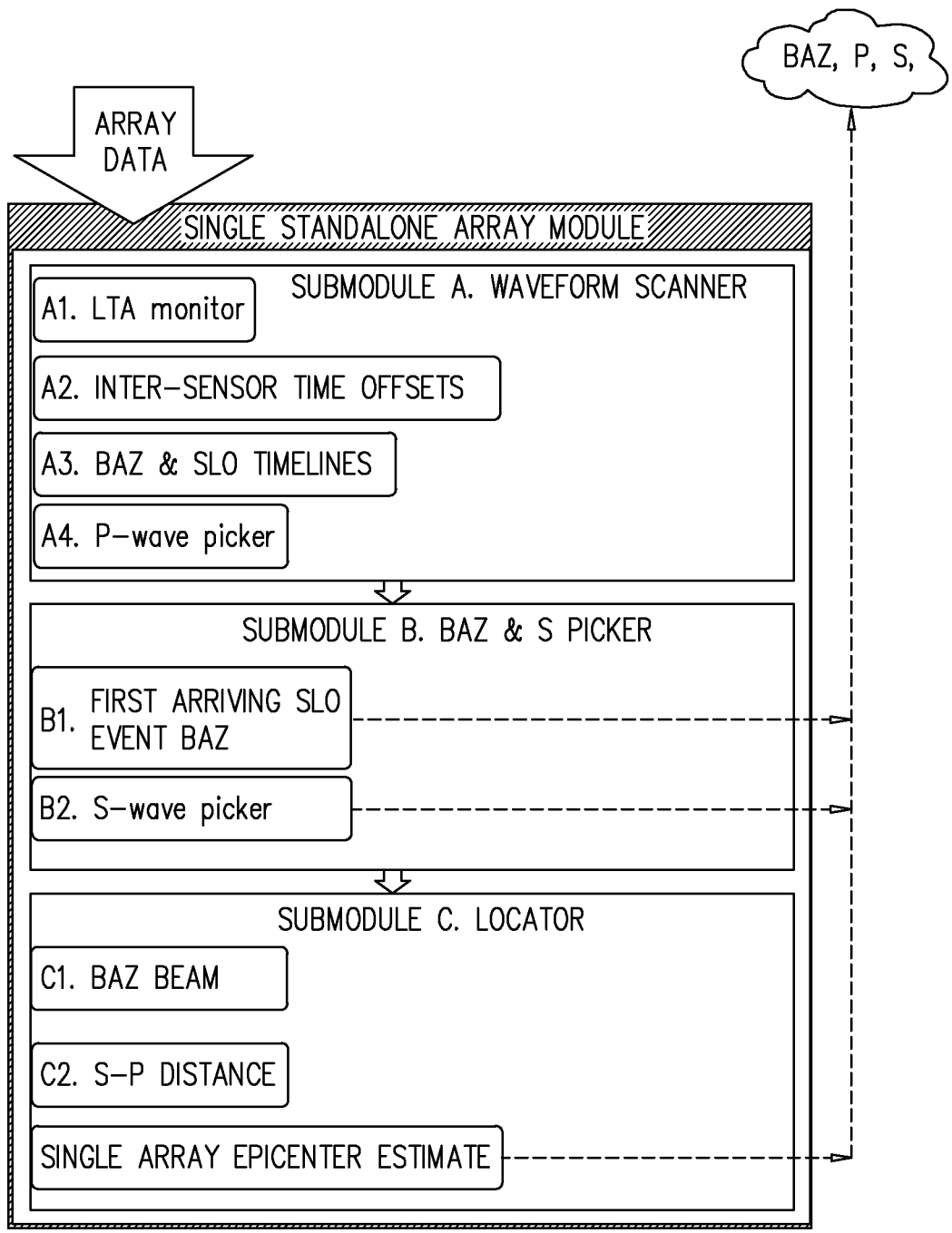
FIGS. 2A and 2B are flowcharts of methods for early detection and warning of an earthquake, in accordance with some applications of the present invention.

Reference is now made to FIG. 2A, which is a flowchart of a method for early detection and location of a seismic source based upon data received from a single sensor array. As noted above, upon the earlier receiving of P-wave and S-wave arrival data from a single sensor array, the central computing unit 100 in FIG. 1A may determine an epicenter of a seismic event source, by applying a single array module (hereinafter "SAM") algorithm. The SAM algorithm monitors the back azimuth (hereinafter "BAZ") and slowness of the coherent waves. Changes in those parameters are used to identify the P-wave and S-wave arrivals of the earthquake, and, subsequently, the hypocentral distance and/or epicentral distance. The latter, together with the back azimuth and an empirical relation between the time interval between the arrival of the first S-wave and the arrival of the first P-wave (hereinafter "S-P") and epicentral distance (and/or hypocentral distance), is used to determine epicentral location (and/or hypocentral location).

The SAM algorithm typically comprises three submodules A, B, C, as shown in FIG. 2A. In submodule A, the SAM algorithm continuously scans the data received from the sensor array and outputs timelines of slowness and back azimuth, and picks up the arrival of the first P-wave. Submodule B uses the slowness and back azimuth output by submodule A, to estimate seismic event back azimuth and initial slowness, and to detect the arrival of the S-wave. Submodule C then integrates the available data to constrain epicentral and/or hypocentral locations. Typically, the detection of the arrival of the first arriving S-wave at the array, as well as the detection of the epicentral and/or hypocentral locations, are performed in real time (e.g., within less than 5 seconds, within less than two seconds, or within less than 1 second) with respect to the arrival of the first arriving S-wave at the array.

The SAM algorithm is applied upon detection of a seismic event, for example, using a Short Term Averaging/Long Term Averaging (STA/LTA) trigger algorithm. In a first step A1, for each sensor, the module continuously computes the ground-motion root mean square of a given previous time period of data (e.g., the last 5 seconds of data). In a step A2, the system calculates inter-sensor time offsets, by computing an inter-sensor cross-correlation matrix for each sensor, e.g., using a 0.5-second-long moving data window, or a 1-second-long moving data window. To resolve the short time offsets resulting from the relatively small intra-array apertures (e.g., 45-350 meters, as described above), high-sampling rate (e.g., between 300 and 800 Hz, e.g., 500 Hz) and sub-sample cross-correlation methods are implemented. Step A2 then outputs the inter-sensor coherency parameters and time offsets for each sensor.

In a step A3, for each sensor, the SAM algorithm computes the apparent slowness vector of the P-wave arrival. Step A3 typically comprises partitioning the n-sensor array into a set of $N!/[3!(N-3)!]$ combinations. For each such combination, the SAM algorithm computes the apparent slowness vector via solution of:

$$\begin{pmatrix} S_e \\ S_n \end{pmatrix} = (X^T X)^{-1} X^T \begin{pmatrix} \Delta t_{12} \\ \Delta t_{23} \\ \Delta t_{13} \end{pmatrix},$$

in which $\Delta t$ are the inter-sensor time offsets, with subscripts indicating the sensor indexes, and the e and n subscripts of the slowness vector indicating east and north directions, respectively. The X matrix reads as:

$$X = \begin{pmatrix} x_{12}^e x_{12}^n \\ x_{23}^e x_{23}^n \\ x_{13}^e x_{13}^n \end{pmatrix},$$

with x being an inter-sensor distance. Next, the SAM algorithm computes the scalar slowness, SLO, and the back azimuth, BAZ, according to:

$$SLO = (S_e^2 + S_n^2)^{1/2}$$

$$BAZ = a\tan 2(S_e, S_n).$$

SLO and BAZ estimates are trustable if the traces are coherent and the set of inter-sensor time offsets is self-consistent, i.e., it satisfies $\Delta t_{12} + \Delta t_{23} = \Delta t_{13}$ (see Cansi, Y., J.-L. Plantet, and B. Massinon (1993), *Earthquake location applied to a mini-array: k-spectrum versus correlation method*, Geophys. Res. Lett., 20, 1819-1822, which is incorporated herein by reference). Thus, the SLO and BAZ estimates are weight averaged proportionally to:

$$W = \begin{cases} CC \cdot SC, & SC \geq 0.8 \\ 0, & SC < 0.8 \end{cases}$$

where CC is a parameter between 0 and 1 that quantifies the waveforms coherency as:

$$CC = CC_{12} \cdot CC_{23} \cdot CC_{13},$$

and the SC is a parameter between 0 and 1 that quantifies the self-consistency of the three inter-sensor time-offsets according to:

$$SC = 1 - \frac{\Delta t_{12} + \Delta t_{23} - \Delta t_{13}}{|\Delta t_{12}| + |\Delta t_{23}| + |\Delta t_{13}|}.$$

Typically, combinations for which SC is less than a given value, e.g., less than 0.8, are disregarded.

Step A3 then typically outputs the weighted-average SLO and BAZ estimates corresponding to the sensor the mean W of which is the highest.

In a step A4, sub-module A typically picks the P-wave arrival once the following four criteria are satisfied: (a) $W \geq 0.5$, (b) the $SLO \leq 0.5$ for more than half of the subarray combinations, (c) the current ground motion over the array is at least five times larger than the preceding LTA value, and (d) the vertical rms is larger than that of the horizontal.

A submodule B of the SAM algorithm then begins once the slowness drops to values which indicate seismic source (rather than anthropogenic sources). For some applications, a step B1 time-averages the median SLO and BAZ estimates weighted by their W. The averaging interval ends once the BAZ stabilizes (typically less than 0.2 seconds). Step B1 then outputs the first arriving SLO and event BAZ, as well as their observed ranges. Under poor SNR conditions, the drop to seismic slowness may only occur well after the STA/LTA detection, during the passage of the S-wave. In such cases, submodule B only reports an event BAZ.

When the slowness drop to seismic values occurs shortly after the STA/LTA detection (within 0.5 seconds), the slowness estimate is declared as that of the P-wave. A step B2 then uses the output of step A4, and declares S-wave arrival if the following two criteria are satisfied: (a) the slowness rises to a value that is given multiple of the P-wave slowness (e.g., more than 1.5 times the P-wave slowness), and (b) the back azimuth is within a given range of observed BAZ at the P-wave arrival (e.g., within plus/minus 30 degrees of the observed BAZ at the P-wave arrival).

Submodule C then locates the epicenter of the seismic event progressively, based on the back azimuth calculation, the time interval between the arrival of the first S-wave and the arrival of the first P-wave (S-P), and an array-specific empirical relation between (S-P) and the epicentral distance, R:

$$S-P = a+bR$$

in which a and b are array-specific coefficients based on empirical calculations.

In a step C1, a back azimuth beam is formed with the BAZ estimate and an uncertainty score corresponding to the observed range. In a step C2, once an S-wave is detected, the hypocenter region is constrained by the width of the BAZ beam at the distance given by the time interval between the arrival of the first S-wave and the arrival of the first P-wave (S-P). For sensor arrays for which sensor number is between 3 and 6 sensors, the computation time is negligible, and the SAM algorithm is well-suited for real time applications. When the hypocenter is located beneath the array or the event is teleseismic, the wavefront typically approaches the array subvertically. In such cases, the inter-sensor delays may be more difficult to resolve. Nevertheless, the SC parameter (defined hereinabove), which checks for the consistency of the inter-sensor delays, typically indicates whether the result is trustable. If it is not, BAZ and SLO typically cannot be estimated, and the array functions as a single standard station.

Typically, the system described herein is adept at avoiding false alarms by discriminating between seismic events (such as earthquakes) and non-seismic (e.g., anthropogenic) sources. Typically, a real-time screening module checks waveform amplitudes and cross-correlation coefficients on the vertical traces of each sensor array. First, waveform amplitudes are compared; if amplitude variations exceed 50% on one or more horizontal traces within a sensor array, the system typically indicates that the source is confined within or very near the array at distances that are shorter than the minimal depth of shallow earthquakes. In that case, the event is flagged and can be attributed it to a nearby non-seismic source. Low to minimal amplitude variations are typically determined to relate to a remote source. Typically, the back azimuth is estimated by cross-correlating all vertical traces of each sensor array. Several scenarios are typically flagged as anthropogenic sources: (i) an anomalously low (e.g., 500 m/sec or less) back azimuth velocity; (ii) a lack of consistency between back azimuth velocity estimations for P-wave and for S-wave; (iii) back azimuth estimations for P-wave showing high angular dispersion (e.g., 10 degrees or more); and/or (iv) back azimuth estimations for P-wave and for S-wave with high angular misfit (e.g., 20 degrees or more).

Figure 2B:
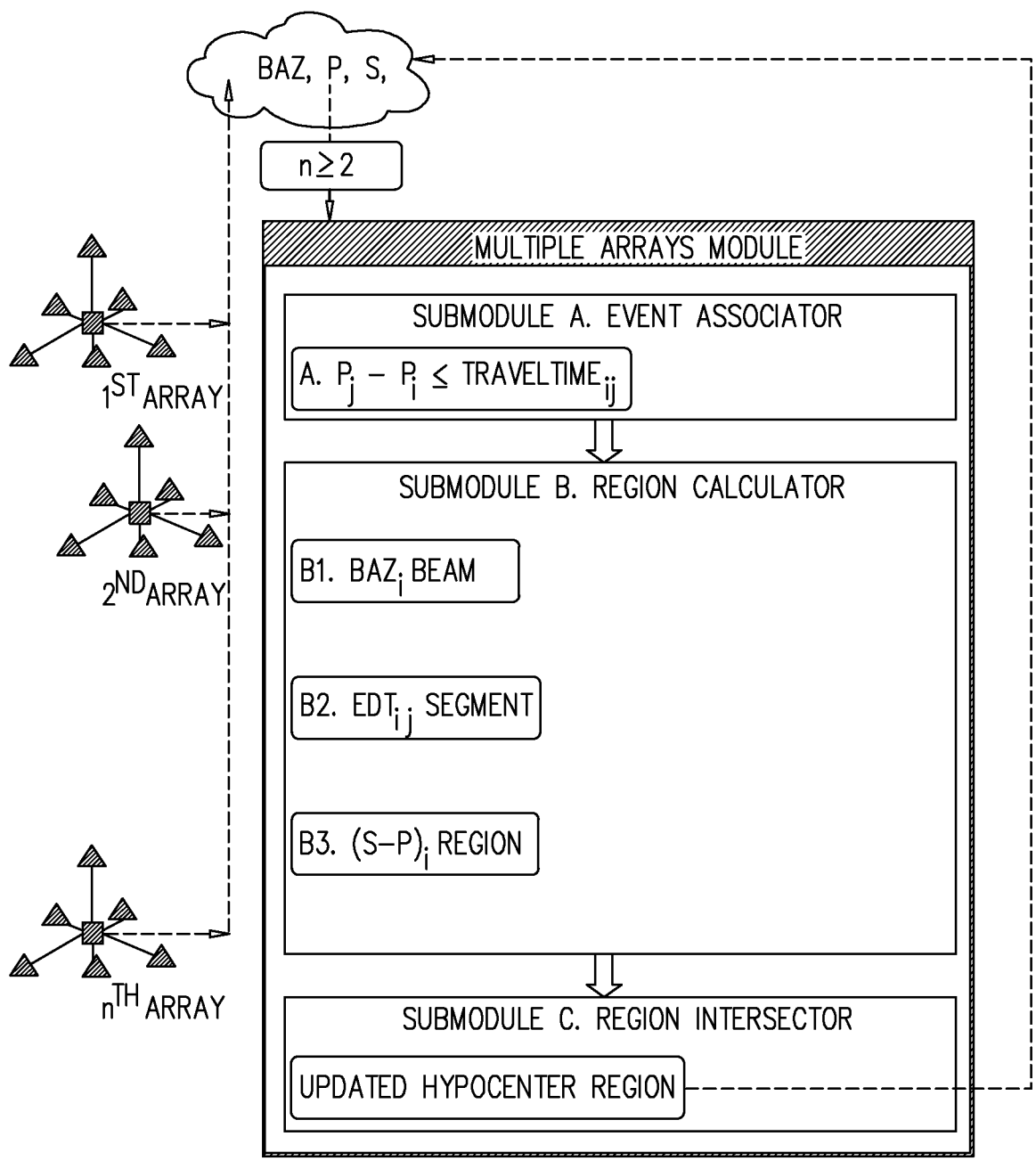

Reference is now made to FIG. 2B, which is a flowchart of a method for early detection and warning of an earthquake, based upon data received from at least two sensor arrays. For some applications, upon the earlier receiving of P-wave arrival data from at least two sensors arrays, the central computing unit 100 in FIG. 1A determines an epicenter of a seismic event by applying a multiple array module (MAM) algorithm. Under the MAM algorithm, unambiguous epicenter locations are typically obtained by intersecting multiple back azimuth beams with additional available location constraints. The MAM algorithm begins once at least two P-wave detections become available from two distinct sensor arrays. A submodule A of the MAM algorithm associates two P-wave detections if the following time-space condition is met:

$$|Tp_i - Tp_j| \leq \frac{R_{ij}}{V_P},$$

in which the subscripts i and j are the array indexes and $R_{ij}$ is the inter-array distance.

Once a seismic event has been recognized by submodule A, a submodule B begins by calculating a back azimuth beam as in step C1 of the SAM algorithm above. In a step B2, the MAM algorithm computes an equal-differential-time (EDT) region by identifying the set of spatial coordinates that satisfies the equality between observed and calculated arrival time differences:

$$T_{P_i} - T_{P_j} = T_{P_i}^{calc}(\eta,\xi) - T_{P_j}^{calc}(\eta,\xi) | i \neq j.$$

Uncertainties in the P-wave picking, and the velocity model are typically accounted for. For example, the uncertainties may be accounted for as follows: the maximum wave picking uncertainty is set to 20 percent of the moving data interval (0.1 s), and the maximum velocity model variation is set to plus/minus 5 percent of the 1D 4-layer Israel Seismic Network (ISN) P-velocity model. Using a standard Monte Carlo approach, these uncertainties are translated into travel-time uncertainties and are mapped onto the EDT surfaces.

In a step B3, once an S-wave detection becomes available, the MAM algorithm typically calculates a spherical region around the sensor array that registered the S-wave arrival according to:

$$S-P = a+bR$$

with thickness that accounts for uncertainties in the wave picking and the empirical parameters.

Submodule C of the MAM algorithm aggregates the BAZ, EDT and S-P wave constraints in their order of arrival, and intersect them to obtain a shrinking hypocenter location with time.

Experimental Results

SAM Algorithm

Figure 3A:
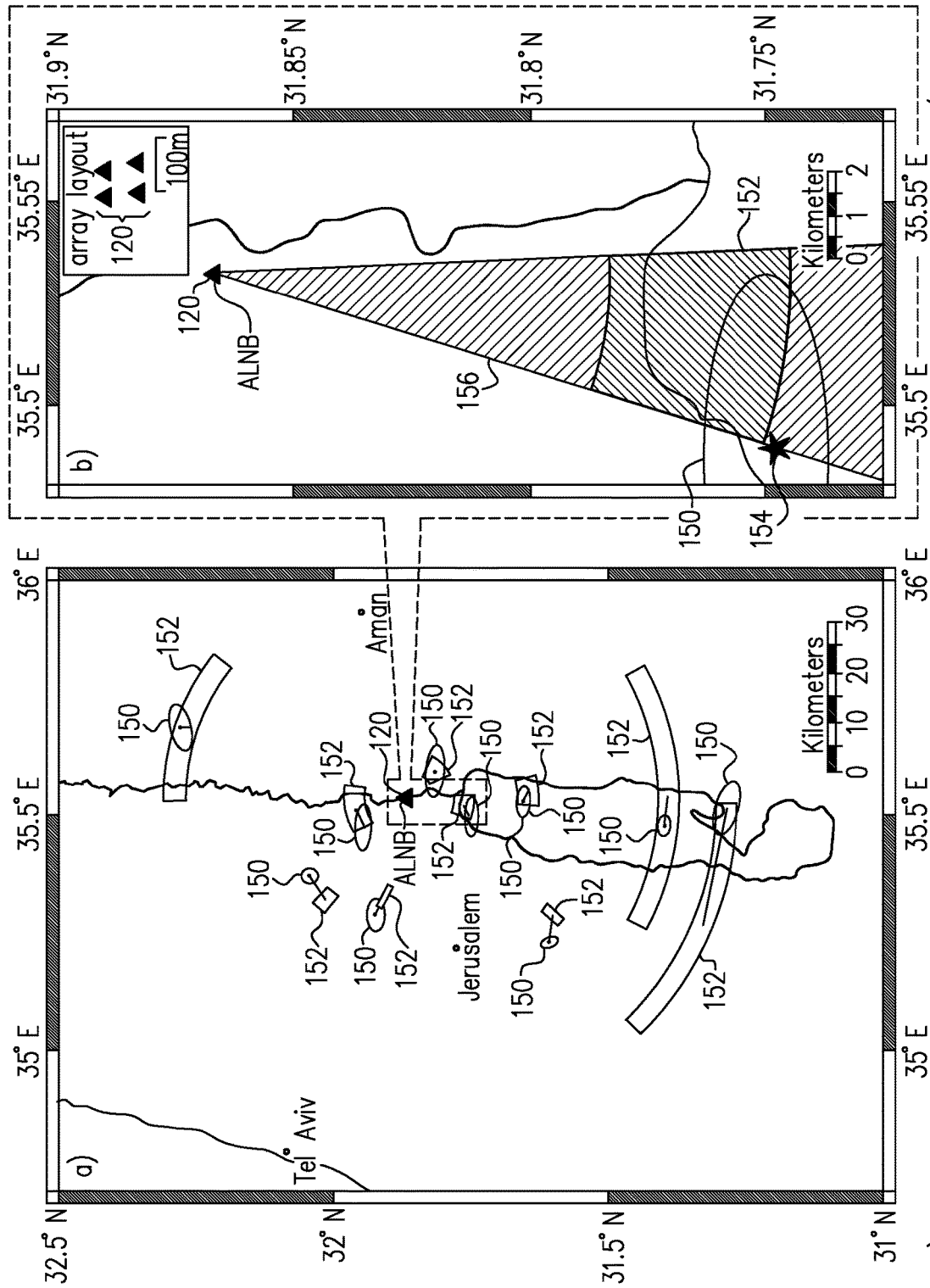
FIG. 3A shows a location map of seismic events as detected, in accordance with some applications of the present invention.

The performance of the SAM algorithm was tested during 10 earthquakes (magnitude 1.7 to 4.4) in the Dead Sea Transform (DST) fault area, which were reported by the Israel Seismic Network (ISN) catalog. The earthquakes were recorded by a small-aperture array (known as ALNB). FIG. 3A provides location maps of the test study area showing the ALNB sensor array 120 and the 10 earthquakes analyzed in this test. Panel (a) shows a comparison between ISN catalog and SAM algorithm-based epicenters, with ellipses 150 indicating ISN catalog locations with corresponding uncertainties, and with arc sections indicating SAM algorithm-based locations with corresponding uncertainties.

Panel (b) of FIG. 3A is an enlargement of a portion of panel (a) of FIG. 3A. A dashed rectangle shows the location of panel (b) within panel (a). Panel (b) shows the Jun. 9, 2015, magnitude 2 Kalia earthquake. Star 154 indicates the ISN catalog location, with ellipse 150 indicating the corresponding uncertainty. Thus, star 154 indicates the seismic source, with ellipse 150 indicating the corresponding uncertainty. The solid black triangle indicates the location of ALNB array 120, the layout of which is shown in the inset. The ALNB array consisted of four sensors deployed in a square geometry (as shown in the inset of FIG. 1b) with a maximum intra-array aperture of 100 m. The sensors included three 3D short period sensors and one 1D short period sensor, During the test period, the SAM algorithm detected and then computed the BAZ and S-P estimates for the 10 earthquakes described in the below table:

| Date | Time | Latitude | Longitude | Magnitude |
|---|---|---|---|---|
| 20 May 2015 | 03:26:50.97 | 32.044 | 35.366 | 1.7 |
| 21 May 2015 | 01:23:23.42 | 31.814 | 35.587 | 2.1 |
| 9 Jun. 2015 | 20:59:21.92 | 31.748 | 35.489 | 2.0 |
| 29 Jul. 2015 | 22:25:42.94 | 31.949 | 35.472 | 2.0 |
| 30 Jul. 2015 | 02:39:05.83 | 31.403 | 35.471 | 4.4 |
| 15 Aug. 2015 | 07:39:48.57 | 31.288 | 35.506 | 3.1 |
| 6 Mar. 2016 | 22:55:03.87 | 31.927 | 35.286 | 2.0 |
| 6 Jan. 2017 | 05:15:47.22 | 32.278 | 35.682 | 3.2 |
| 23 May 2017 | 22:58:49.37 | 31.609 | 35.227 | 2.0 |
| 2 Jun. 2017 | 12:19:48.72 | 31.657 | 35.526 | 2.1 |

These 10 earthquakes provide azimuthal coverage around the ALNB array. The single standalone array module ("SAM" described with reference to FIG. 2A) was tested in offline mode with 25 months of data recorded by ALNB.

Figure 3B:
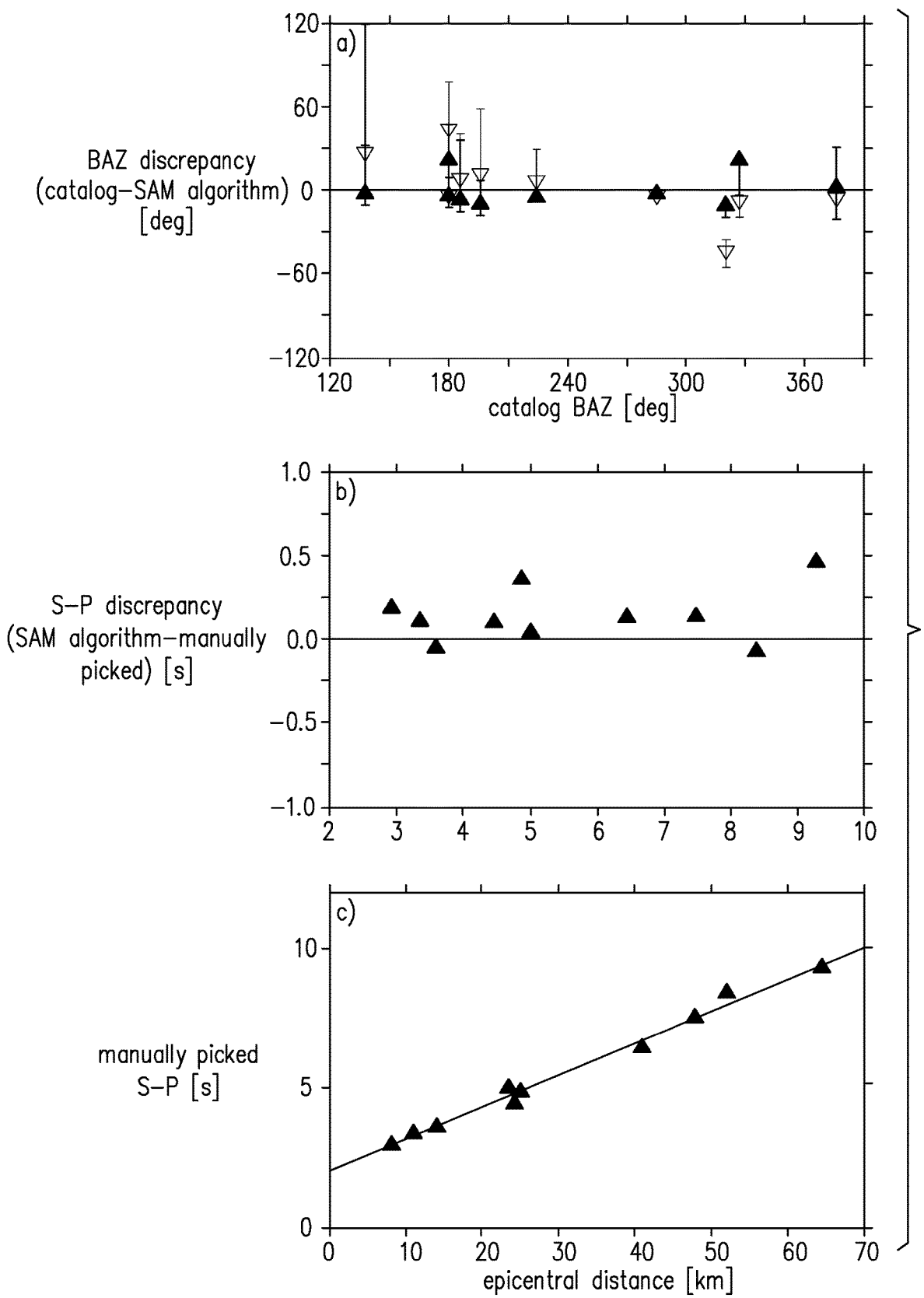
FIGS. 3B, 3C, 3D illustrate experimental test results for methods for detection of seismic events, in accordance with some applications of the present invention.

Reference is now made to FIG. 3B. The top graph (plot a)) in FIG. 3B shows a plot of BAZ discrepancies as a function of ISN catalog BAZ, for each of the 10 earthquakes. The discrepancy between the catalog-based BAZ and the SAM algorithm-based BAZ in each case is indicated by the black triangles. By way of comparison, for each of the 10 earthquakes, the plot also shows the discrepancy between the catalog-based BAZ and the BAZ calculated using a standard f-k analysis in a frequency range of 1 to 10 Hz, these discrepancies being indicated by the white upside-down triangles. The plot reveals an average absolute discrepancy of less than 10 degrees between SAM algorithm-based BAZ and ISN catalog BAZ. The vertical lines in the plot indicate the range of BAZ estimates obtained in step B1 of the SAM algorithm, which averaged to about 13 degrees. The lack of trend on the diagrams confirms that azimuthal bias due to local subsurface structure or array configuration may be ruled out. A comparison between the discrepancies for the BAZ estimates obtained with the SAM algorithm (black triangles in plot a)), and with the standard f-k analysis in a frequency range of 1 to 10 Hz (white upside-down triangles in plot a)) indicates a slightly better performance of the former. Typically, partitioning the array into 3-sensors combinations allows identifying and discarding inconsistent and poor quality estimates, thus enhancing the robustness of the SAM algorithm.

A plot of (a) the S-P discrepancies (i.e., the discrepancy between "S-P" as calculated by the SAM algorithm, and the actual "S-P" interval as determined by manually picking the data for the arrival of the first S-wave and the arrival of the first P-wave in offline mode, from the previously-acquired data), as a function of (b) the manually picked S-P intervals is shown in plot b) of FIG. 3A. This plot indicates an average discrepancy of less than 0.2 seconds between the SAM-algorithm-based and manually picked S-P values, with a constant uncertainty of 0.5 seconds resulting from the length of the moving time-window. It is emphasized that the discrepancies reported in plots a) and b) are not only due to limitations of the SAM algorithm and of the array aperture, but also due to the large ISN catalog location uncertainties resulting from poorly resolved velocity model for the Dead Sea basin and its complex subsurface.

Manually picked S-P intervals (i.e., the "S-P" interval as determined by manually picking the data for the arrival of the first S-wave and the arrival of the first P-wave from the previously-acquired data) as a function of the ISN catalog epicentral distances are shown in plot c) of FIG. 3B. In addition, a linear best-fitting curve has been added. (It is noted that in plot c) of FIG. 3B, epicentral rather than hypocentral distances are used, since the ISN catalog depth uncertainties are large with respect to the epicentral distances considered here. In general, the terms epicenter and hypocenter and related terms are used interchangeably in the present applications, and some steps that are described as being performed with respect to an epicenter may be performed with respect to a hypocenter, and vice versa.)

Uncertainties in the S-P intervals, empirical S-P versus distance relation, and BAZ estimates are mapped into location uncertainties. Out of the 10 single array-based locations, 7 results lie well within the uncertainty limits of ISN catalog locations, and the remaining 3, with array-source distances exceeding 50 km, are located within less than 5 kilometers from the ISN catalog locations. It is thus concluded that the SAM algorithm provides reliable real-time location estimates, using exclusively data from a single standalone array. As it is for standard regional EEWS, the effectiveness of the real-time array-based location depends on the epicenter-array-target configuration. A necessary condition for timely warnings is that the array-to-epicenter distances be shorter than those of the epicenter-to-target. With respect to Amman, this warning condition is satisfied for 9 out of the 10 earthquakes, and for Jerusalem 6 times.

Figure 3C:
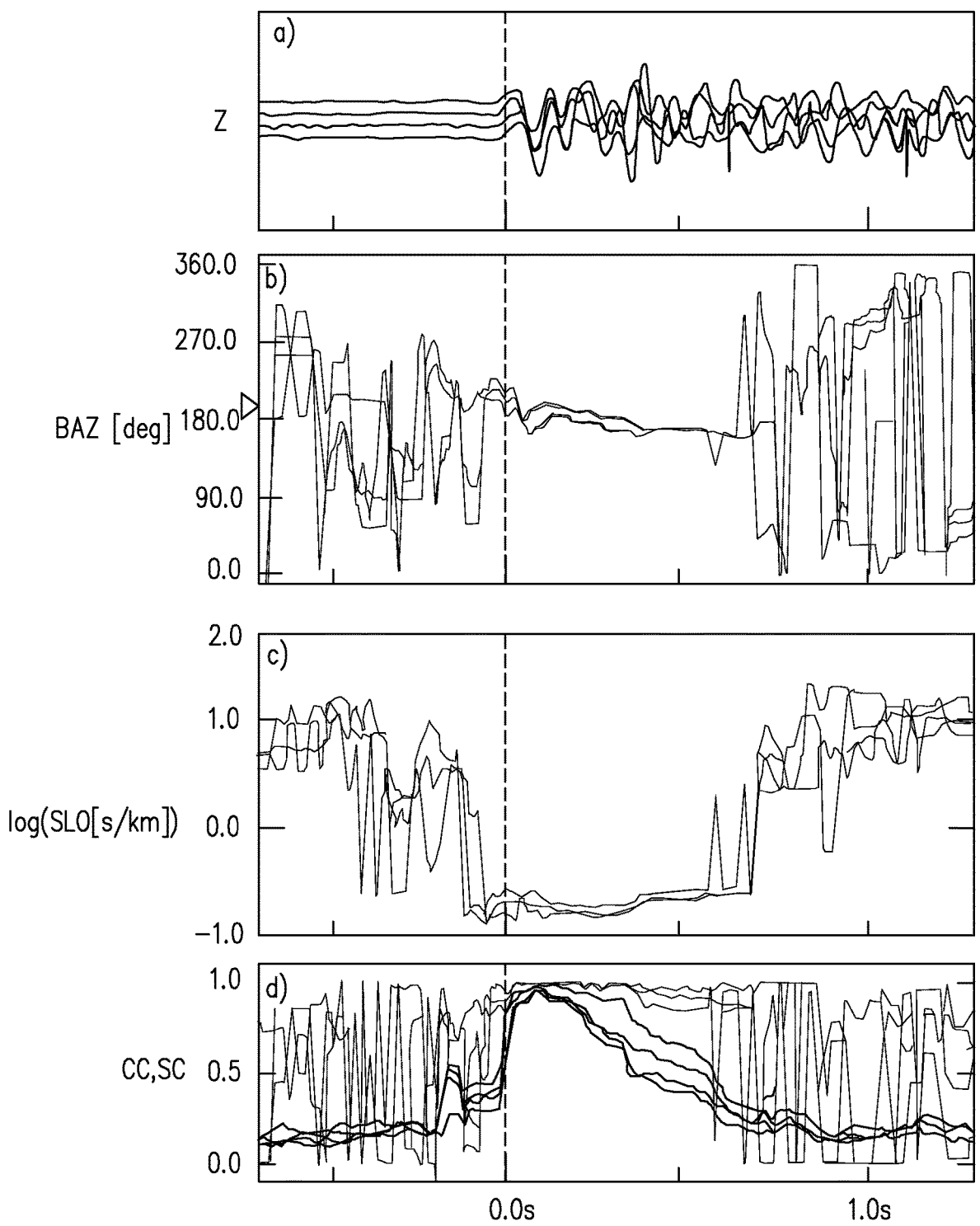

Reference is now made to FIG. 3C, which shows a) two seconds of P-wave vertical-component waveforms, and timelines of b) BAZ, c) SLO and d) CC (thicker lines) and SC (thinner lines), within the context of the Jun. 9, 2015, magnitude 2 earthquake, the epicenter of which is indicated by black star 154 in FIG. 3A panel (b). Because the array aperture is small and site effects are uniform, the waveforms exhibit high similarity, and the cross-correlation approach yields robust inter-sensor time-offsets, as indicated in FIG. 3C. Prior to the P-wave arrival (vertical dashed line in FIG. 3C), the BAZ and SLO estimates obtained for each 3-sensor combination are highly variable and non-stable. Shortly after the STA/LTA detection, these estimates converge into a narrow band (shown in plots b) and c)), and the combination-specific CC and SC stabilize initially very close to their maximal value of 1 (plot d)). (As noted above, typically combinations with SC less than 0.8 are disregarded.)

Figure 3D:
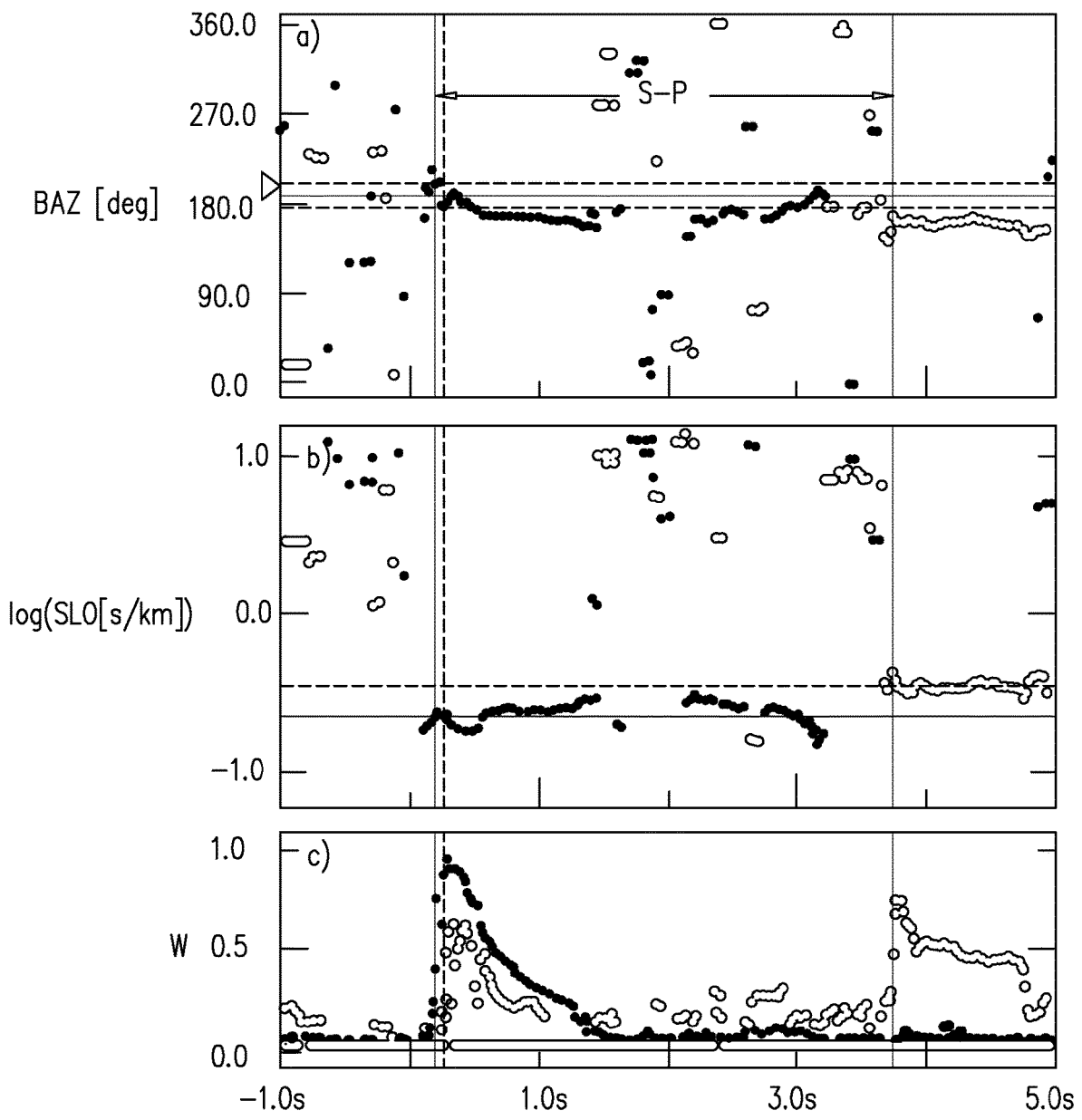

Reference is now made to FIG. 3D, which shows timelines of a) mean BAZ, b) SLO and c) W for a 6-second long interval that includes the P-wave and S-wave detections, again within the context of the Jun. 9, 2015, magnitude 2 earthquake, the epicenter of which is indicated by black star 154 in FIG. 3A panel (b). Prior to the P-wave pick, the mean W is low, and consequently both BAZ and SLO estimates are highly variable. The arrival of the P-wave (first vertical line) is accompanied by an abrupt rise in the mean W. This increase is apparent in the vertical component (represented by the black data points) and horizontal components (represented by the white data points), but is stronger (close to 1) in the vertical component than in the horizontal components. The mean W corresponding to the vertical component remains above the horizontal values for 1 second, during which both BAZ and SLO are highly stable. The array-based BAZ (indicated by the solid horizontal line in plot a)) is in good agreement with the ISN catalog BAZ (indicated by the triangle adjacent to the ordinate of plot a)). The observed SLO (solid horizontal line in plot b)) is consistent with that of steeply approaching P-waves. This P-wave SLO value is multiplied by the $V_P:V_S$ ratio to serve as a baseline (horizontal dashed line in plot b)) for further S-wave identification. The mean W picks up again after about 3.5 seconds, BAZ stabilizes back to previous values, and SLO rises gradually above the P-wave value (horizontal solid line in plot b)). An S-wave arrival is declared once the SLO reaches the expected S-wave slowness. About 0.2 seconds after the P-wave is picked by the ALNB array, a BAZ estimate (cone 156 in FIG. 3A) is available that points towards the epicenter (black star). The final uncertainty-based epicentral estimate (arc 152 in FIG. 3A), which is declared at the time of the S-wave pick (at 3.7 s), overlaps with the ISN catalog location uncertainty ellipse 150 (as shown in panel (b) of FIG. 3A).

MAM Algorithm

Figure 4:
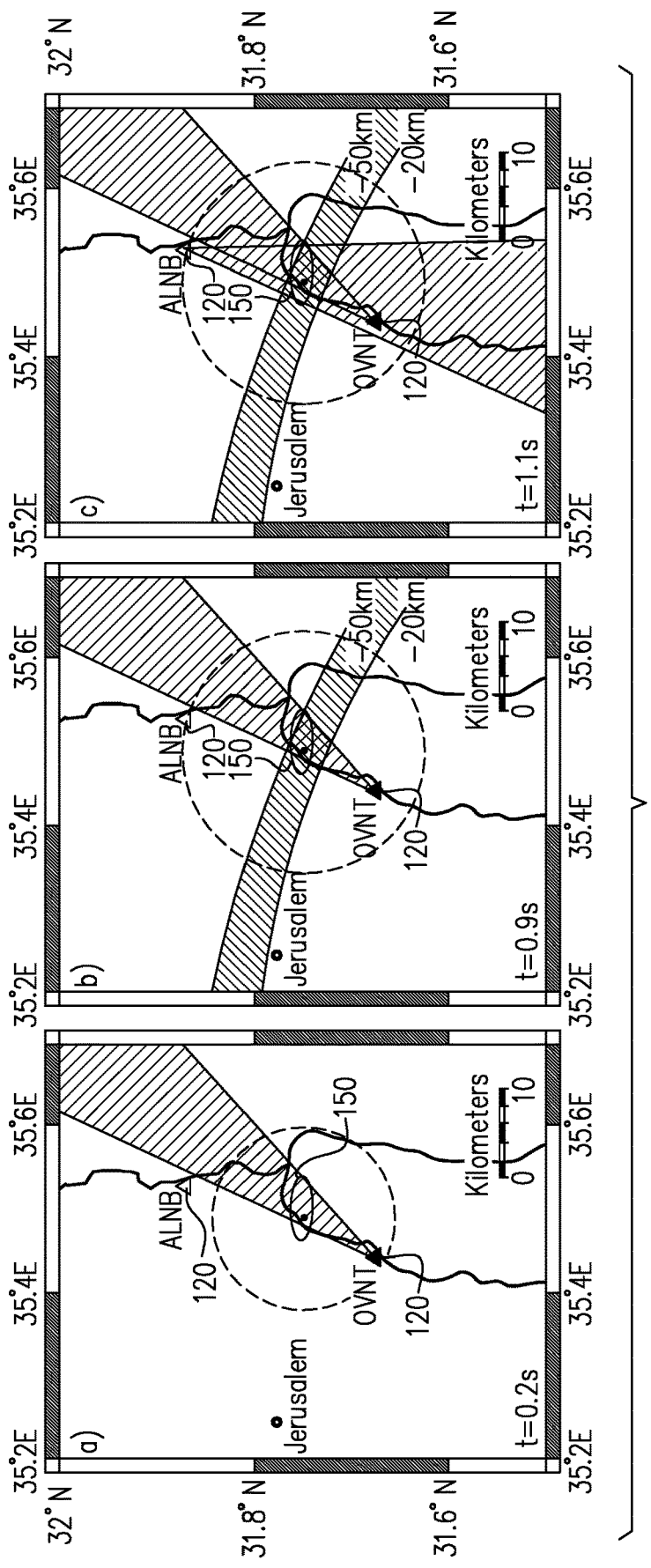
FIG. 4 shows a location map of a seismic event as detected, in accordance with some applications of the present invention.

Reference is now made to FIG. 4, which demonstrates the performance of the MAM algorithm (described with reference to FIG. 2B) in relation to the Jun. 9, 2015, magnitude 2 earthquake examined in the preceding section, in accordance with some applications of the present invention. The MAM algorithm typically aggregates all available constraints in real-time. The discussion is based upon data received from the ALNB array described hereinabove, as well as an array known as the OVNT array. The OVNT array has intra-array apertures of 210 m, is located 23 km to the south of ALNB, and has one 3D short period sensors and five 1D short period sensors.

The earthquake was initially detected by the OVNT array, and a north-east pointing BAZ was obtained 0.2 second after the P-wave was picked (as indicated by panel a) of FIG. 4). About 0.7 seconds later, a P-wave was picked at the ALNB array, instantaneously delimiting an EDT zone, the thickness of which accounts for picking, velocity model and depth uncertainties (as indicated in panel b) of FIG. 4). After another 0.2 seconds, a second BAZ beam is computed at ALNB that points towards OVNT (as indicated in panel c) of FIG. 4). The intersection of the two BAZ beams with the EDT zone provides an unambiguous epicentral zone that overlaps well with that of the ISN catalog (indicated by ellipse 150). At that time, 1.1 seconds after the first detection at OVNT, the P-wave front (dashed line in panel c) of FIG. 4) is 2-3 seconds away from the cities of Jerusalem, Israel and Amman, Jordan. The S-wave front, which has not yet reached the surface, will take an additional 8 or 11 seconds before hitting Jerusalem and Amman, respectively. Interestingly, the dimension of the hypocentral region constrained by these two arrays is equivalent to that of the SAM algorithm using data from ALNB only (indicated in FIG. 3A). In this example, however, because the standalone module "waits" for the S-wave arrival, it would take an additional 2.6 seconds for the SAM algorithm to output a hypocentral zone.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for analyzing a seismic source, the method comprising:
   identifying an arrival of a first arriving S-wave emitted from the seismic source at an array of sensors in real-time, by:
   continuously analyzing waveforms received by the sensors;
   continuously monitoring back-azimuth and slownesss datta within the waveforms;
   identifying an arrival of a first arriving P-wave of the waveforms, based upon the back-azimuth and slowness data;
   based upon the monitored slowness of the identified first arriving P-wave, identifying the arrival of the first arriving S-wave at the array of sensors;
   calculating an epicentral distance of the seismic source with respect to the array of sensors, based upon a time difference between the arrival of the first arriving S-wave and the arrival of the first arriving P-wave;
   locating an epicenter of the seismic source based on the epicentral distance and the back-azimuth of the first arriving P-wave; and
   generating a warning regarding an earthquake based on the detected located epicenter of the seismic source.

2. The method according to claim 1, wherein identifying the arrival of the first arriving S-wave emitted from the seismic source at the array of sensors comprises identifying the arrival of the first arriving S-wave emitted from the seismic source at an array of sensors having intra-array sensor apertures of less than 350 meters.

3. The method according to claim 1, wherein identifying the arrival of the first arriving P-wave emitted from the seismic source at the array of sensors comprises discriminating between seismic events and non-seismic sources of waveforms.

4. The method according to claim 1, wherein calculating the epicentral distance of the seismic source with respect to the array of sensors based upon the time difference between the arrival of the first arriving S-wave and the arrival of the first arriving P-wave comprises using an empirically-determined relationship between (a) the time difference between the arrival of the first arriving S-wave and the arrival of the first arriving P-wave and (b) the epicentral distance.

5. The method according to claim 1, wherein identifying the arrival of the first arriving S-wave at the array of sensors based upon the determined slowness of the first arriving P-wave comprises identifying a waveform having a slowness that is a multiple of the determined slowness of the first arriving P-wave.

6. The method according to claim 5, wherein identifying the arrival of the first arriving S-wave at the array of sensors further comprises identifying that the waveform having the slowness that is the multiple of the determined slowness of the first arriving P-wave has a back azimuth that is within a range of the back azimuth of the first arriving P-wave.

7. An apparatus for analyzing a seismic source, the apparatus comprising:
   an array of sensors configured to detect waveform data; and at least one computer processor configured to identify an arrival of a first arriving S-wave emitted from the seismic source at the array of sensors in real-time, by:
continuously analyzing waveforms received by the sensors,
continuously monitoring back-azimuth and slowness data within the waveforms,
identifying an arrival of a first arriving P-wave of the waveforms based upon the back azimuth and slowness data,
based upon the monitored slowness of the identified first arriving P-wave, identifying the arrival of the first arriving S-wave at the array of sensors,
calculating an epicentral distance of the seismic source with respect to the array of sensors, based upon a time difference between the arrival of the first arriving S-wave and the arrival of the first arriving P-wave,
locating an epicenter of the seismic source based on the epicentral distance and the back-azimuth of the first arriving P-wave, and
generating a warning regarding an earthquake based on the detected located epicenter of the seismic source.

8. The apparatus according to claim 7, wherein within the array of sensors each of the sensors is separated from adjacent sensors by a distance of less than 350 meters.

9. The apparatus according to claim 7, wherein the at least one computer processor is configured to identify the arrival of the first arriving P-wave emitted from the seismic source at the array of sensors by discriminating between seismic events and non-seismic sources of waveforms.

10. The apparatus according to claim 7, wherein the at least one computer processor is configured to calculate the epicentral distance of the seismic source with respect to the array of sensors using an empirically-determined relationship between (a) the time difference between the arrival of the first arriving S-wave and the arrival of the first arriving P-wave and (b) the epicentral distance.

11. The apparatus according to claim 7, wherein the at least one computer processor is configured to identify the arrival of the first arriving S-wave at the array of sensors based upon the determined slowness of the first arriving P-wave by identifying a waveform having a slowness that is a multiple of the determined slowness of the first arriving P-wave.

12. The apparatus according to claim 11, wherein the at least one computer processor is configured to identify the arrival of the first arriving S-wave at the array of sensors by identifying that the waveform having the slowness that is the given multiple of the determined slowness of the first arriving P-wave has a back azimuth that is within a range of the back azimuth of the first arriving P-wave.

* * * * *